United States Patent [19]
Bakke et al.

[11] Patent Number: 5,537,658
[45] Date of Patent: Jul. 16, 1996

[54] DISTRIBUTED DIRECTORY METHOD AND STRUCTURE FOR DIRECT ACCESS STORAGE DEVICE (DASD) DATA COMPRESSION

[75] Inventors: Brian E. Bakke; Daniel F. Moertl; Bruce M. Walk, all of Rochester, Minn.

[73] Assignee: International Business Machines Corporation, Armonk, N.Y.

[21] Appl. No.: 484,612

[22] Filed: Jun. 7, 1995

[51] Int. Cl.⁶ .................................................. G06F 17/30
[52] U.S. Cl. .................. 395/888; 395/600; 364/DIG. 1; 364/260.4; 364/260.6; 364/282.1; 364/282.3
[58] Field of Search ........................ 395/600, 888, 395/404, 497.01, 497.02; 364/715.02

[56] References Cited

U.S. PATENT DOCUMENTS

| | | | |
|---|---|---|---|
| 5,031,124 | 7/1991 | Bosinoff et al. | 364/551.01 |
| 5,113,512 | 5/1992 | Miki et al. | 395/416 |
| 5,212,786 | 5/1993 | Sathi | 395/600 |
| 5,237,675 | 8/1993 | Hannon, Jr. | 395/888 |
| 5,241,672 | 8/1993 | Slomcenski et al. | 395/600 |
| 5,315,655 | 5/1994 | Chaplin | 380/4 |
| 5,349,577 | 9/1994 | Mikamo | 369/47 |
| 5,357,607 | 10/1994 | Sathi et al. | 395/166 |
| 5,388,093 | 2/1995 | Yoshida et al. | 369/124 |
| 5,394,534 | 2/1995 | Kulakowski et al. | 395/439 |
| 5,463,772 | 10/1995 | Thompson et al. | 395/600 |

OTHER PUBLICATIONS

Brodie et al. Pat. Appln. Ser. No. 08/343,316 filed Nov. 22, 1994—Method and Means for Managing Linear Mapped Address Spaces Storing Compressed Data at the Storage Subsystem Control Unit or Device Level.

*Primary Examiner*—Paul V. Kulik
*Attorney, Agent, or Firm*—Joan Pennington

[57] ABSTRACT

A distributed directory structure and method are provided for writing directory information for compressed data on a direct access storage device (DASD). DASD includes a plurality of compression groups for storing compressed data. A micro directory table is written within each of the compression groups for the corresponding compressed data in the compression group. Compressed data and a directory update are written with a single write operation. A macro directory table is written in one area of the DASD. The macro directory table includes directory information used for translating a logical address to a physical base address for each compression group. The micro directory table includes directory information used for translating a logical address for a requested data page to a physical page address and page length within the compression group.

9 Claims, 9 Drawing Sheets

| | | | | |
|---|---|---|---|---|
| HDR0 | DRIVE WRITE COUNT 4-35 | | | |
| HDR1 | X'1x' | X'00' | X'00' | X'CE' |
| X'000' | AAAALLLL | AAAALLLL | AAAALLLL | AAAALLLL |
| X'004' | AAAALLLL | AAAALLLL | AAAALLLL | AAAALLLL |
| | *** | *** | *** | *** |
| X'0F8' | AAAALLLL | AAAALLLL | AAAALLLL | AAAALLLL |
| X'0FC' | AAAALLLL | AAAALLLL | AAAALLLL | AAAALLLL |
| X'100' | llll llll | llll llll | llll llll | llll llll |
| X'104' | llll llll | llll llll | llll llll | llll llll |
| | *** | *** | *** | *** |
| X'17C' | llll llll | llll llll | llll llll | llll llll |
| X'180' | EXCEPTION REGION USED BIT MAP BYTES 0-3 | | | |
| X'184' | EXCEPTION REGION USED BIT MAP BYTES 4-7 | | | |
| X'188' | EXCEPTON REGION USED BIT MAP BYTES 8-11 | | | |
| X'18C' | EXCEPTION REGION USED BIT MAP BYTES 12-15 | | | |
| X'190' | DATA AREA AAAA COUNT | | DATA AREA LLLL COUNT | |
| X'194' | HOST PAGE ADDRESS 0-20 | | B'000' | ER L CNT |
| X'198' | PAGE WRITTEN COUNT | | ssss ssss | FLAGS |
| X'19C' | cccc cccc | cccc cccc | cccc cccc | cccc cccc |
| X'1A0' | rrrr rrrr | rrrr rrrr | rrrr rrrr | rrrr rrrr |
| | *** | *** | *** | *** |
| X'1FC' | rrrr rrrr | rrrr rrrr | rrrr rrrr | rrrr rrrr |

← PAGE ENTRIES 80

← EXCEPTION REGION 82 ENTRIES

← COMPRESSION GROUP 84 STATISTICS

← CHECK-FIELD 86

← RESERVED UNUSED

MICRO TABLE 44

FIG.1B

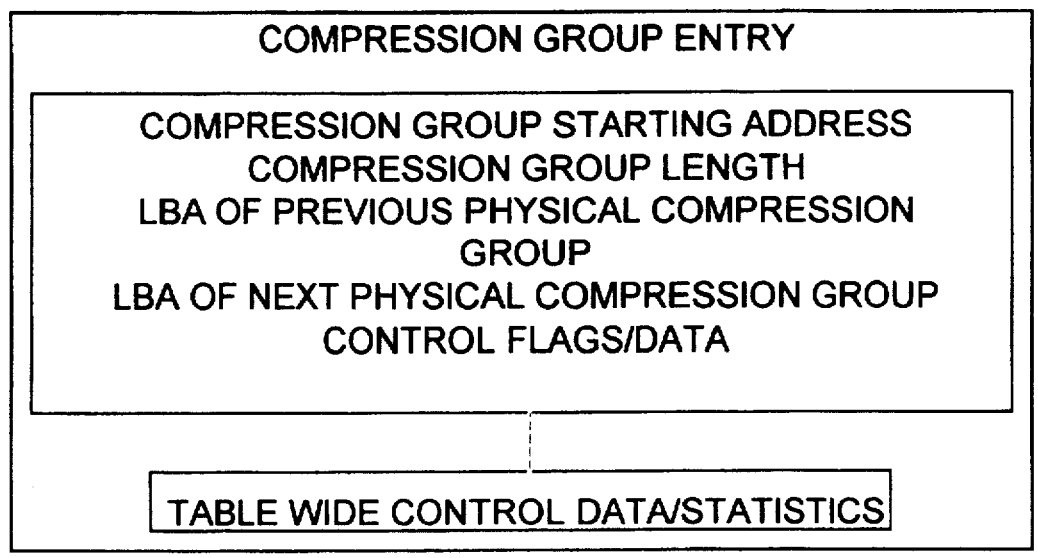
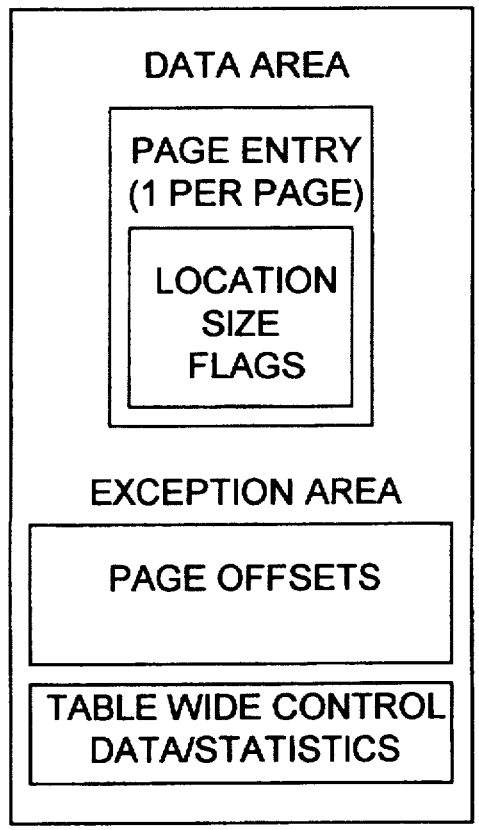
FIG.3

DISTRIBUTED DIRECTORY METHOD AND STRUCTURE FOR DIRECT ACCESS STORAGE DEVICE (DASD) DATA COMPRESSION

FIELD OF THE INVENTION

The present invention relates to a distributed directory structure and method for writing directory information for compressed data on a direct access storage device (DASD).

DESCRIPTION OF THE PRIOR ART

Computers often include auxiliary memory storage units having media on which data can be written and from which data can be read. Disk drive units or DASDs, often incorporating stacked, commonly rotated rigid magnetic disks, are used for storage of data in magnetic form on the disk surfaces. Data is recorded in radially spaced data information tracks arrayed on the surfaces of the disks. Transducer heads driven in a path toward and away from the drive axis write data to the disks and read data from the disks. A data cylinder includes a set of corresponding data information tracks for the stack of disk surfaces. In a DASD using fixed block architecture FBA), the data information tracks are divided into equally sized segments or sectors. Each sector is assigned a number or logical block address (LBA). Typically, a data file is written and read using consecutive LBA's, trackfollowing on the data information tracks of successive consecutive logical data surfaces from the starting LBA. Fragmentation occurs when blocks of data from the file are written to available discontinuous sectors at different locations on the DASD.

To utilize the relatively limited amount of the available data storage capacity of DASDs, data may be stored by a compression technique. However to effectively utilize DASDs, response time should be both predictable and fast. Response time consistency is an extremely important consideration. In cases of heavy work load, response time must at least be predictable. For batch operations, businesses typically rely on certain windows of low system load to run background applications. If time requirements for these applications are not consistent and predictable, it becomes difficult to schedule the work flow, potentially resulting in windows of time where the system is heavily overloaded.

Most storage subsystems rely on fixed size system pages to manage data on DASD. Applying data compression techniques for DASD on a system with fixed page sizes results in compressed pages of variable length that can subsequently change in size as they are updated. This characteristic poses a new and significant challenge to the placement and management of compressed data on a DASD. When a device controller is responsible for both the compression and decompression as well as this management, an efficient mechanism is required such that performance is not significantly reduced, response time remains consistent, controller cost targets are met and appropriate for the class of target system, and data integrity exposures are not introduced.

In a traditional file system without compression, the sequence of operations to put data on a DASD consists of three activities. Initially a first write consists of two parts including a directory write for space allocation fellowed by, the data write. The data and directory are normally in two separate and distinct areas of the DASD. Secondly, subsequent data reads can occur. Thirdly subsequent data writes can occur.

When data compression is utilized, this sequence is similar, however, subsequent data writes typically require an additional directory update step. Since the data's compressed size and/or location can change, the directory information must be continually updated to reflect the changes and avoid data integrity problems.

The impact of this on overall performance can be significant and severe. For a traditional subsystem, if 'N' accesses are made to a block of data where we assume that the access pattern is 50% reads and 50% writes, this results in a total of N+1 DASD operations. With data compression, however, the total becomes 1.5*N. On a commercial system, this increase in operations will have a sizable impact on user response time as well as limit the throughput capability of the subsystem to approximately 66% from the system's perspective.

A need exists for a mechanism that enables efficient management and operation for subsystem controlled data compression on commercial data processing systems.

SUMMARY OF THE INVENTION

Important objects of the present invention are to provide a distributed directory structure and method for writing directory information for compressed data on a direct access storage device (DASD); and to provide such distributed directory structure and method that overcome many of the disadvantages of prior art arrangements.

In brief, a distributed directory structure and method are provided for writing directory information for compressed data on a direct access storage device (DASD). DASD includes a plurality of compression groups for storing compressed data. A micro directory table is written within each of the compression groups for the corresponding compressed data in the compression group. Compressed data and a directory update are written with a single write operation. A macro directory table is written in one area of the DASD. The macro directory table includes directory information used for translating a logical address to a physical base address for each compression group. The micro directory table includes directory information used for translating a logical address for a requested data page to a physical page address and page length within the compression group.

BRIEF DESCRIPTION OF THE DRAWINGS

The present invention together with the above and other objects and advantages may best be understood from the following detailed description of the preferred embodiments of the invention illustrated in the drawings, wherein:

FIG. 1B is a block diagram illustrating an example of a micro table directory that can be used in the DASD compression system of FIG. 1 in accordance with the present invention;

FIG. 3 is a block diagram illustrating a micro table directory of a compression group and a macro table directory of the DASD compression system of FIG. 1 in accordance with the present invention;

DETAILED DESCRIPTION OF THE PREFERRED EMBODIMENTS

Figure 1:
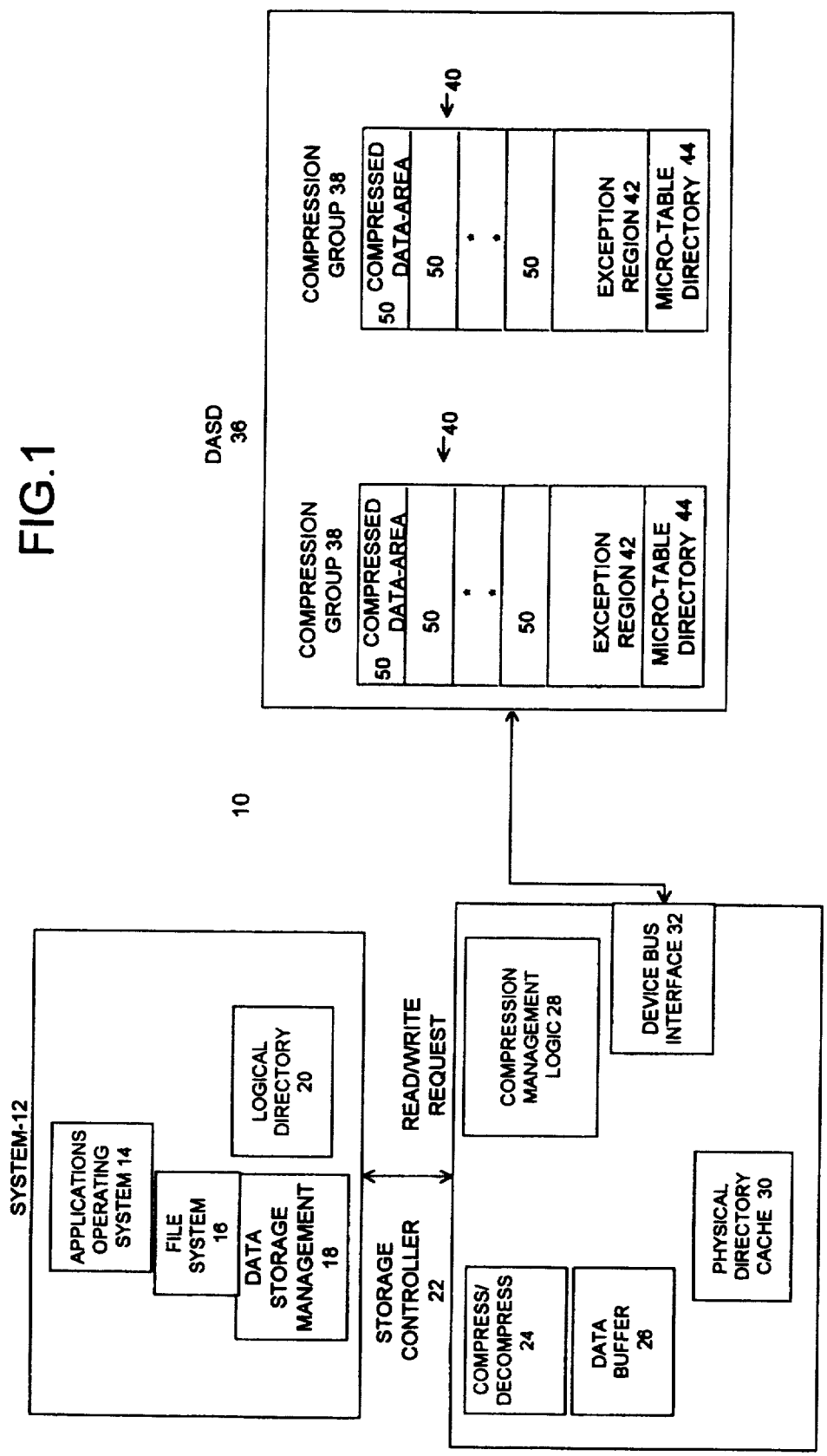
FIG. 1 is a block diagram illustrating a system employing a storage controller for implementing integrated direct access storage device (DASD) compression and a data compression structure in accordance with the present invention.

Referring now to the drawings, in FIG. 1 there is illustrated a block diagram representation of an exemplary system generally designated by 10 for performing a data compression method of the invention. As illustrated, the exemplary system 10 includes a data processing or host system generally designated by 12. Host system 12 includes an application operating system 14, a file system 16 and a direct access storage device (DASD) data storage management function 18 used to store data onto at least one DASD 36. DASD storage management function 18 includes a logical directory 20 that stores the logical block addresses where data is placed on the associated DASD or DASDs 36.

Data is accessed on the DASD 36 through a storage controller generally designated by 22 that compresses data when it is written to the DASD and decompresses data when it is read from the DASD. Storage controller 22 includes a compression and decompression functional block 24, a data buffer 26 for storing data, a compression management logic block 28 for performing address translation and a physical directory cache 30 that is used for storing cached directory elements of the DASD directory generated within the storage controller 22. Storage controller 22 receives data pages from the host system 12, compresses it, and creates compressed data pages to be stored in sectors, appending compression headers that enable directory recovery to occur. Once the physical location of data on DASD is determined by the compression management logic 28, compressed data is passed to or received from the DASD 36 via a device bus interface 32.

DASD 36 includes a plurality of variable sized compression groups 38, each compression group is used for storing related host system data. Each compression group includes a compressed data area 40 for storing original and updated compressed data, an exception region 42 for storing updated compressed pages that are larger than their original allocated space and a directory or micro table 44 for locating data within the compression group. The compressed data area 40 consists of multiple compression regions 50. Compressed data is organized on DASD 36 so that the spatial relationships of related data are maintained within each compression group 38, together with necessary space management parameters. The compressed data arrangement provides consistent performance in a commercial environment and minimizes performance impact due to using data compression.

Figure 1A:
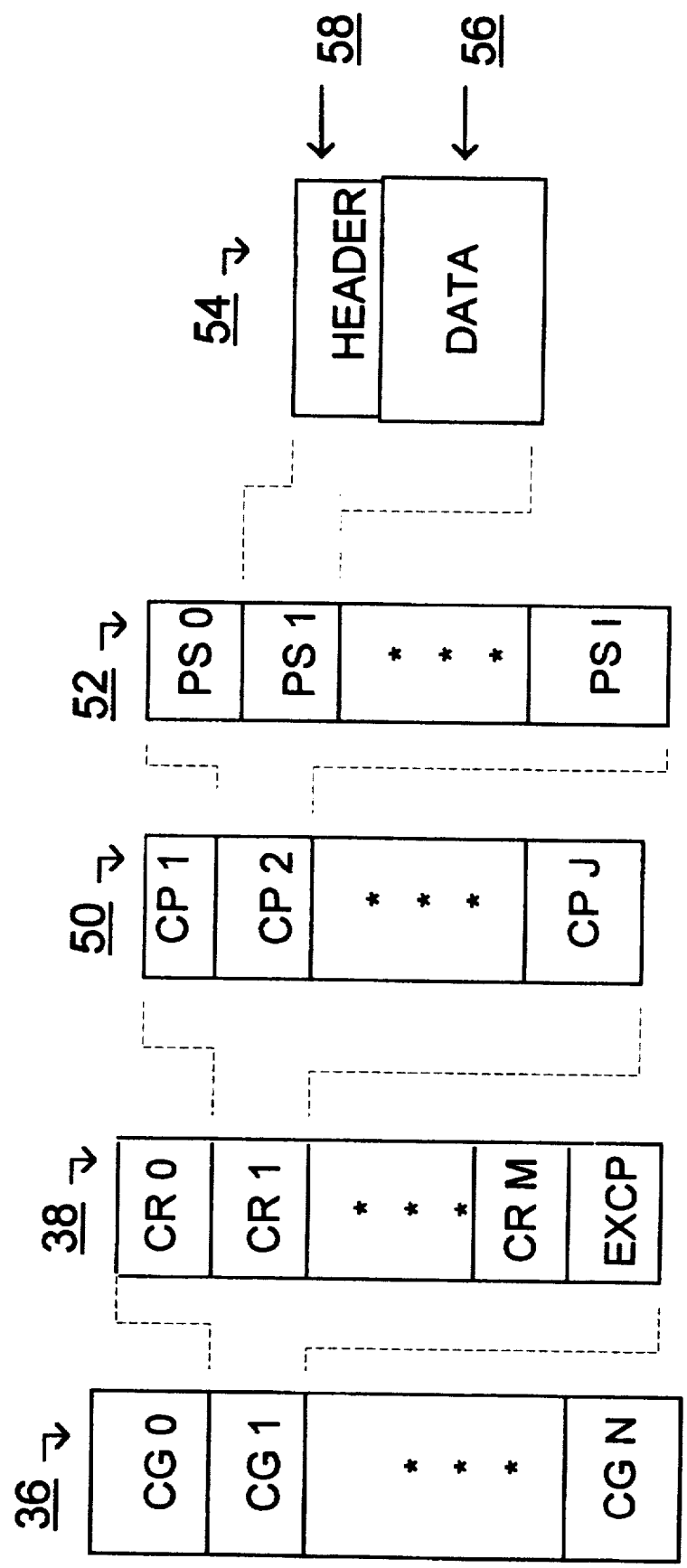
FIG. 1A is a block diagram illustrating a data compression structure in accordance with the present invention.

Having reference now to FIG. 1A, the data compression structure is illustrated. Segmentation of data on DASD is provided into multiple finite blocks or compression groups 38 (CG0 through CG N). Each compression group 38 is managed as an integral unit with space allocated flexibly within it according to a compressed data hierarchy of the invention. Data within each compression group 38 represents a fixed logical address range from the view of host system 12 with variations in physical size depending on the compression characteristics of the stored data. A compression group 38 is not limited to any particular size; however, data storage efficiencies are realized when the compression group size is chosen to be as large or larger than the majority of data blocks that the host system 12 allocates. It should also be relatively large with respect to the system page size. The compression group size is chosen to generally match file system storage management allocation and access patterns. For an IBM AS/400 computer system 12, the compression group size has been selected to be 1 MB with a system page size of 4K. Within the compression group 38, data is stored sequentially in the order dictated by the system addressing model. Each system data page is compressed individually within the group and stored in the physical space equivalent to its compressed size. There is no requirement that compression groups 38 maintain any spatial relationship with respect to one another.

Each compression group 38 consists of a variable number of compression regions 50, and is therefore variable in terms of physical size. As shown, each compression group 38 physically comprises an integral number of compression regions 50 (CR 0 through CR M). Compression regions 50 are used to provide a convenient granularity for managing disk space. Although any size could be used including a sector, the functionally indivisible, minimum addressable data area on DASD 36, selecting the size of the compression region 50 to match the disk geometry, for example, a track size or other implementation dependent size, is beneficial. The use of compression regions 50 is optional, although it contributes to the realization of efficient implementations.

In FIG. 1A, the exception and administration region (EXCP) includes the exception region 42 and the micro table directory 44. EXCP region is predefined space within the compression group 38 for compressed pages that no longer fit in the space currently allocated for them and directory data. The EXCP region consists of an integral number of compression regions 50. Although the EXCP region does affect the sequential storage of data within a compression group 38, exception region 42 ensures that updated data is not stored far from its original storage space and neighboring file data. In many cases, the use of the small computer system interface (SCSI) Skip Read and Skip Write Commands allow for the acquisition of exception region stored data along with its neighboring pages in a single operation. The SCSI Skip Read and Skip Write Commands utilize a skip mask to set selected sectors to be read or written with other sectors set as zero that are skipped. Even when this cannot be accomplished, a long seek is avoided due to the close proximity of the EXCP region. Directory information to aid in the location of data within each block is kept with the data in each compression group 38 within the micro table 44 which is part of the EXCP region 44. Similarly, the close proximity of the directory information to its related data minimizes DASD seeks when the directory must be accessed. Directory information also is cached in the storage controller 22, minimizing updates of directory information in the compression group micro table directory 44.

Each compression region 50 includes multiple compression pages 52 (CP 1 to CP J). The size of the compression page 52 advantageously is selected to be equal to the system page size. This eliminates the need for the DASD subsystem controller 22 to perform read-modify-write operations to a compressed page 52 where only a portion of the data has been modified by the host system 12. The compression region 50 consists of a fixed number of physical sectors 54 containing a variable number of compression pages 52. Physical size of compression page 52 is 1 to n physical sectors 54 (PS 0 - PS i) dependent on the particular compression ratio. Compression pages 52 may span compression regions 50 within a compression group 38.

The physical sector 54 includes compressed data 56 and a physical sector header 58 arranged in accordance with the invention for control information used for rebuilding directory information. Initially DASD 36 is formatted to the proper sector size to accommodate compression headers 58 with the sector contents initially zeroed.

Figure 2:
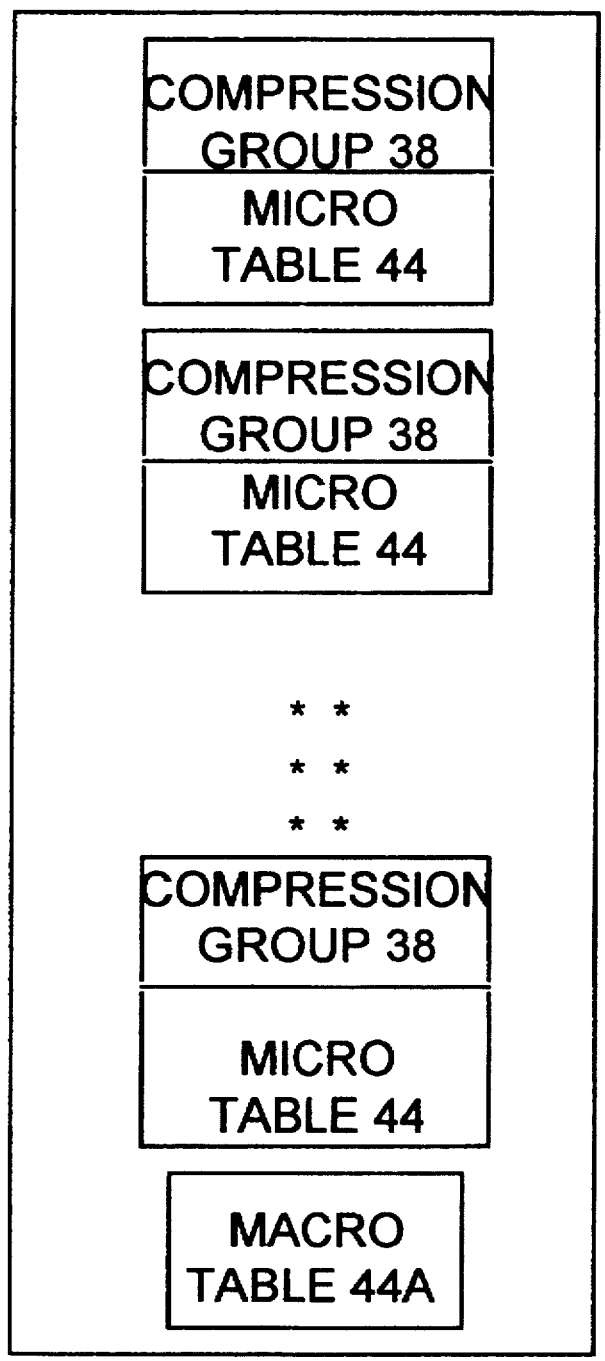
FIG. 2 is a block diagram illustrating a distributed directory structure for the DASD compression system of FIG. 1 in accordance with the present invention.

FIG. 2 is a block diagram illustrating a distributed directory structure for DASD 36. The directory structure for the DASD 36 consists of two major components, the micro table 44 and a macro table 44A. Important features of the invention are the segmentation of the DASD directory into the two separate directory elements, the micro table 44 and the macro table 44A and the location of each on the DASD. FIG. 2 illustrates the location and relationship of the micro directory and macro directory structures 44 and 44A with one another. FIG. 1B provides an example of the micro table 44 that can be used.

The macro table 44A maintains information relevant to a first translation from a system logical address to a starting or physical base address of each compression group 38. The first high order logical to physical translation resolves the physical address of the start of the compression group 38.

The micro table 44 maintains information relevant to a second translation from a system logical address to a starting or physical base address of each requested compression data page within the corresponding compression group 38. The low order logical to physical translation results in the offset and length of the requested page within the compression group 38.

FIG. 3 illustrates the micro table directory 44 written in each compression group 38 and the macro table directory 44A of the DASD 36. The macro table 44A maintains more similarities to a traditional DASD directory. As its name implies, macro table 44A provides a 'macroscopic view' of the location of data blocks. It contains the requisite information to find the compression groups on the DASD. There is one macro table 44A per DASD and all entries are clustered together. Macro table 44A contains a compression group entry for each compression group 38 including a compression group starting address, a compression group length, an LBA to any previous physical compression group, an LBA to any next physical compression group, control flags and data. The LBAs to the previous and next physical compression groups are provided for free space management. Macro table 44A also contains table wide control data and statistics for DASD 36.

In contrast, the micro table 44 describes the physical characteristics of data pages within the compression group 38. There is one micro table 44 per compression group. It is physically unaffiliated with the macro table 44A. It is instead placed within the compression group and therefore located in close proximity to the data that it describes. Micro table 44 contains a page entry including page location, page size and flags for the data area 50 within the compression group. Micro table 44 contains a page entry including page linkage for the exception region 42 with the compression group 38.

Breaking up the directory in accordance with the invention achieves the following advantages. First the size and precise location of each page in the micro table 44 is kept with the data. Both areas can be updated on a write operation by either a single device operation, for example, the SCSI Skip Write operation. The SCSI Skip Write operation allows the write of discontiguous Device Logical Block Addresses over a 1 MB span. Alternatively, a pair of sequential operations may be required; however, the mechanical seek time is minimized due to close proximity of data and directory information.

Figure 4:
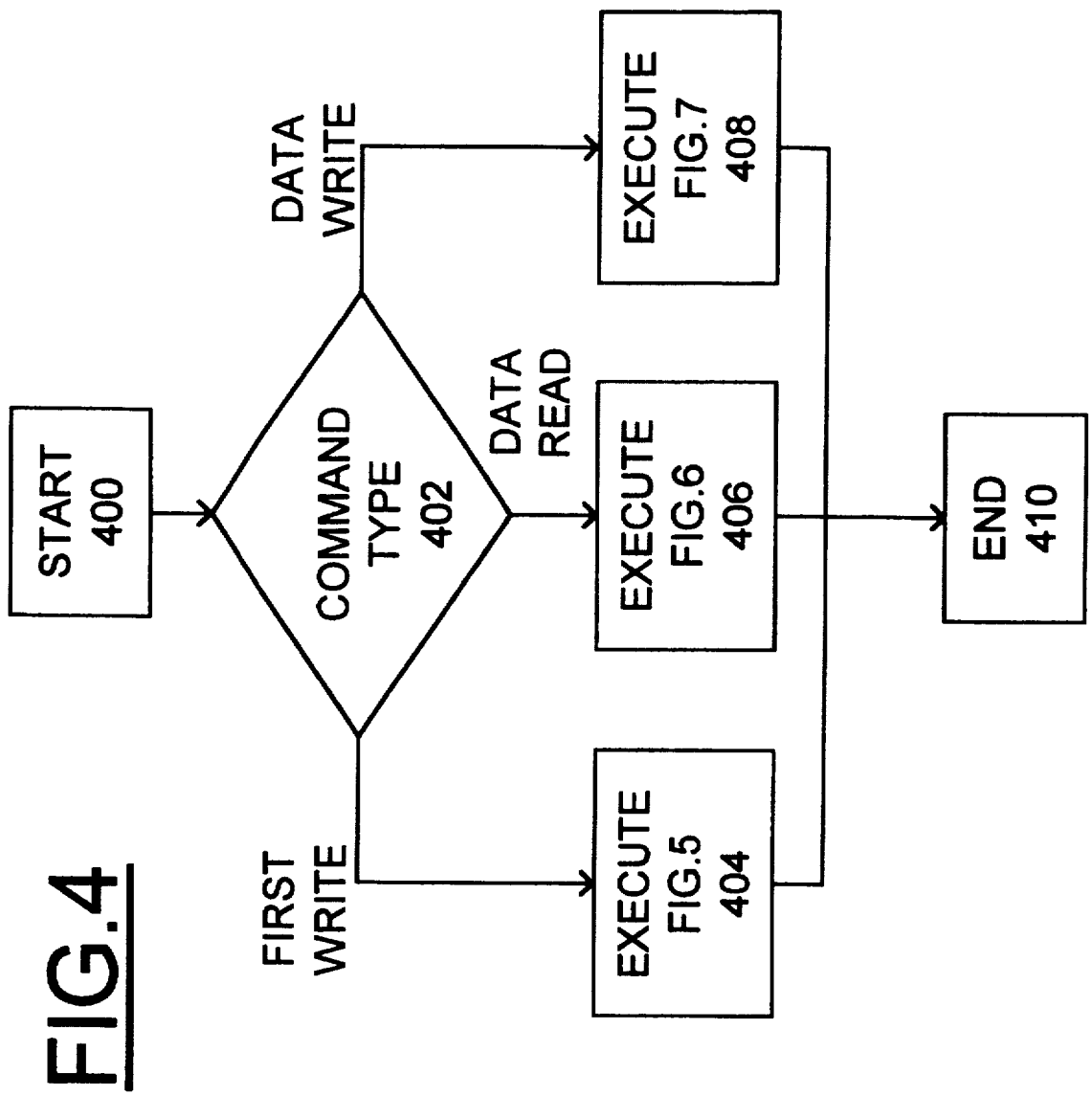
FIGS. 4, 5, 6 and 7 flow charts illustrating logical steps performed by a storage controller of the DASD compression system of FIG. 1 in accordance with the present invention.

FIG. 4 illustrates the sequential operations of a read/write sequence, performed by the storage controller 22 starting at a block 400. First a command type from the host system 12 is identified as indicated at a block 402. When a first write is identified, the sequential operations continue with FIG. 5, as indicated at a block 404. When a data read is identified, the sequential operations continue with FIG. 6, as indicated at a block 406. When a data write is identified, the sequential operations continue with FIG. 7, as indicated at a block 408. This completes the sequence as indicated at a block 410.

Figure 5:
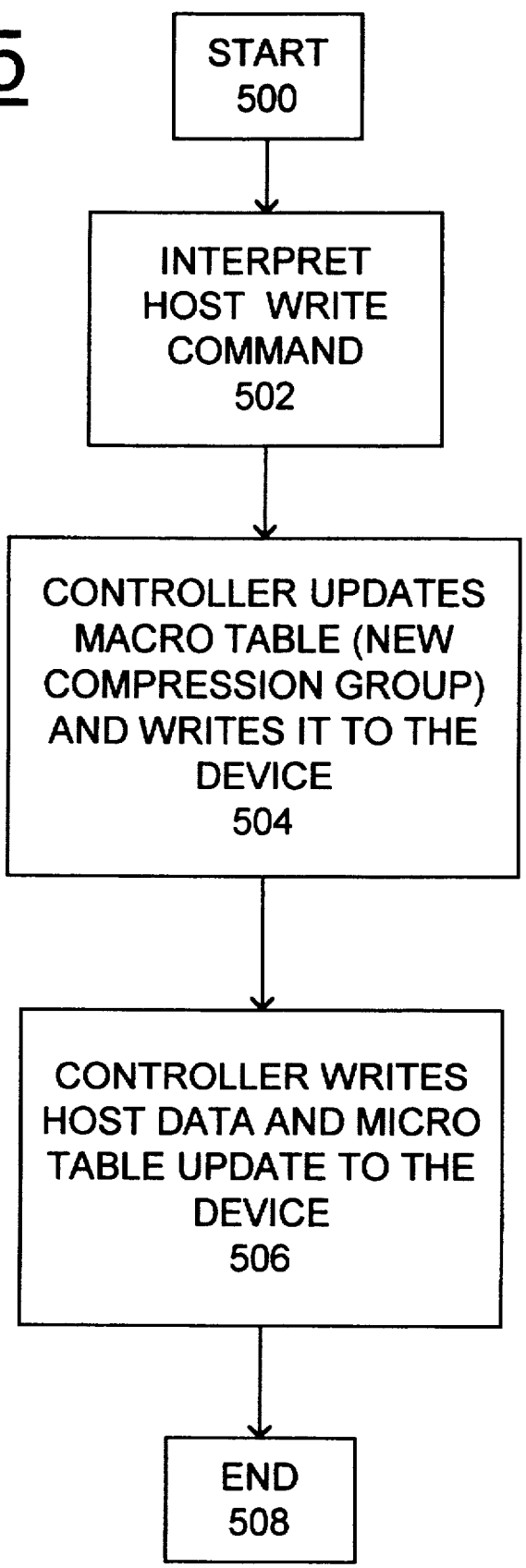

Referring to FIG. 5, the first write starts at a block 500. Storage controller 22 interprets the write command as indicated at a block 502. The storage controller 22 initiates a directory write as indicated at a block 504. The macro table write is followed by a data write and micro table update as indicated at a block 506. This completes the sequence as indicated at a block 508.

Figure 6:
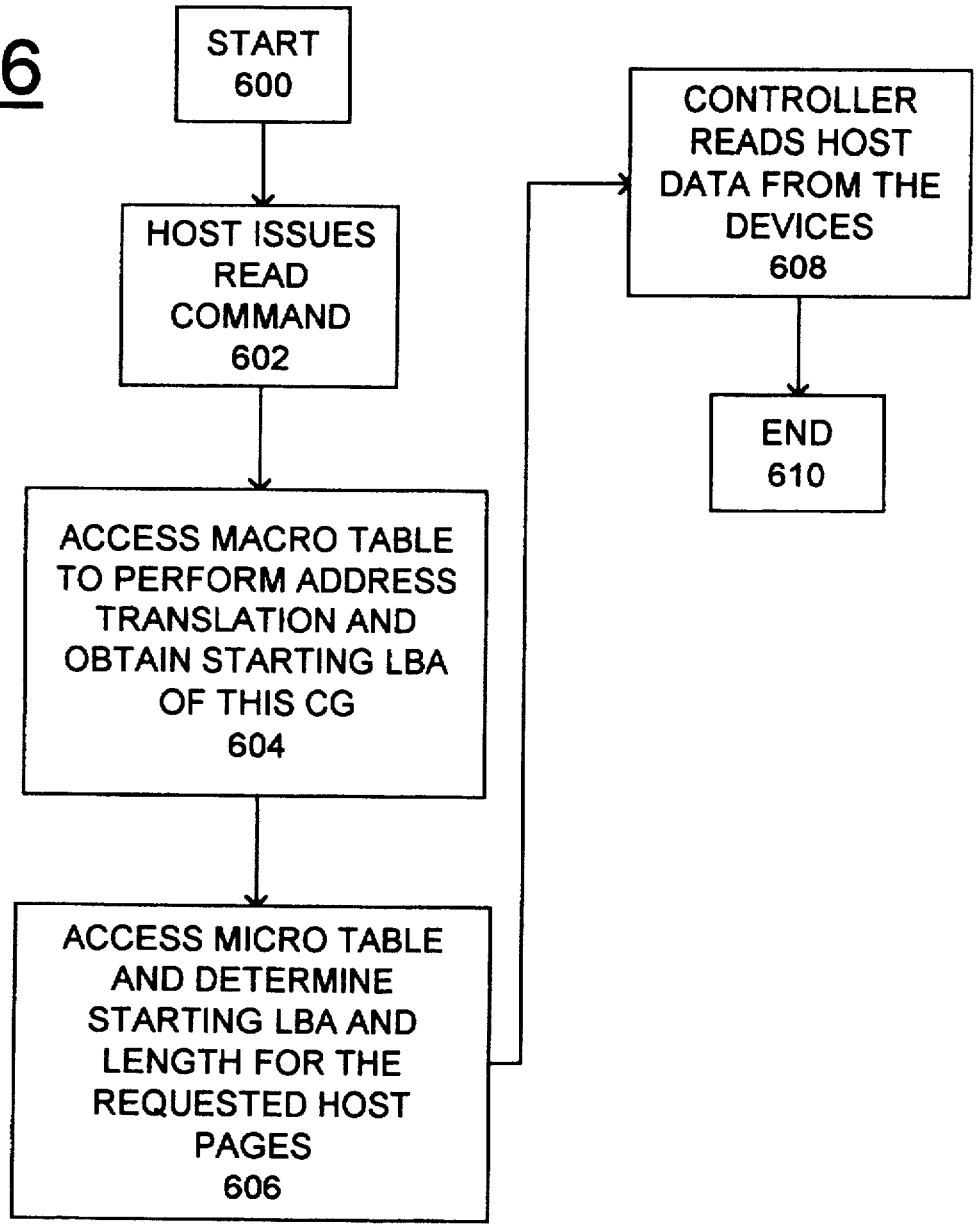

Referring to FIG. 6, the data read operations starts at a block 600. Storage controller 22 interprets a read command as indicated at a block 602. Storage controller 22 accesses the macro table 44A to perform address translation and obtain a starting LBA for this compression group as indicated at a block 604. Storage controller 22 accesses the micro table 44 and determines the starting LBA and length for the requested host pages as indicated at a block 606. The controller 22 reads host data from the device or DASD 36 using the macro table 44A and micro table 44 to determine the physical location and size as indicated at a block 608. This completes the sequence as indicated at a block 610.

Figure 7:
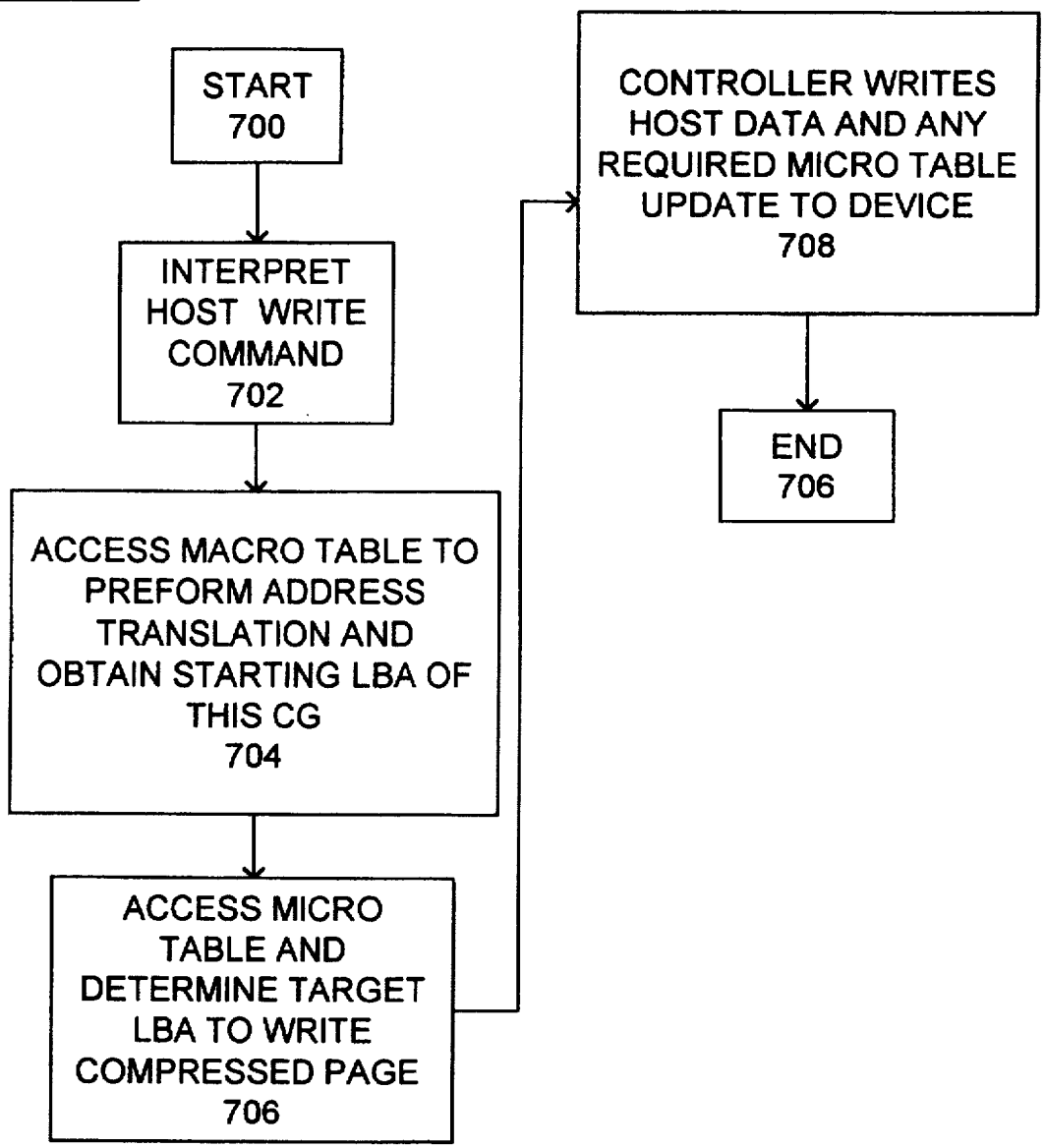

Referring to FIG. 7, the data write operations starts at a block 700. Storage controller 22 interprets a write command as indicated at a block 702. Storage controller 22 accesses the macro table 44A to perform address translation and obtain a starting LBA for this compression group as indicated at a block 704. Storage controller 22 accesses the micro table 44 and determines the starting LBA and length for the requested host pages as indicated at a block 706. The controller 22 writes the host data and any required micro table updates to the device or DASD 36 as indicated at a block 708. This completes the sequence as indicated at a block 710.

In this case, for N accesses, the number of operations approaches the traditional case with a total of 2+N.

An example size for both the micro table 44 and macro table 44A follows, assuming that the compression method and distributed directory structure of the invention can be employed with a DASD 36 having a storage capacity of 1 GB using 4K pages assuming 1 MB compression groups; 1K compression groups with 256 pages per compression group within each compression group. Each page requires a micro table entry with a Logical Block Address offset within the compression group represented by 11 bits, for example up to 2K physical sectors if no compression benefits. The size of the page in physical sectors can be represented by 3 bits. Combining these entry size requirements yields 2 bytes per 256 entries or 512 bytes.

The macro table 44A can be defined by 16 bytes per entry or 16K. Thus, providing a TOTAL=16K+512K=528K per logical GB of DASD. For a traditional DASD data compression arrangement not utilizing the invention, five bytes per entry or about 1.25 MB per logical GB of DASD is required for directory information. The comparison above is simplified to illustrate the approximate magnitude of the difference. Both the invention and conventional arrangements potentially require some additional control information on a real system.

In brief summary, the present invention provides directory partitioning, providing advantages in the areas of performance and directory size efficiency. The directory information stored by the micro table 44 relates to a small subset of the DASD 36. This significantly reduces the addressing domain required to access compressed pages. This reduction results in smaller directory elements that are more feasible to consider caching in the controller 22. The following operational characteristics are realized. First the page as the unit of compression is maintained so that read-modify write operations are not required. Second the number of controller generated operations for directory updates, and/or their impact, are minimized. Third the access pattern of the operation flow remains similar to a non-compressed drive, thus offering consistent response time. Fourth directory size is kept to a minimum, thus enabling cost effective caching.

While the present invention has been described with reference to the details of the embodiments of the invention shown in the drawing, these details are not intended to limit the scope of the invention as claimed in the appended claims.

What is claimed is:

1. A method for writing directory information for compressed data on a direct access storage device (DASD) comprising the steps of:

providing a plurality of compression groups for storing compressed data;

writing a micro directory table within each of said compression groups for providing corresponding directory information for a corresponding compression group;

writing a macro directory table at a predefined location on the DASD for providing directory information for said plurality of compression groups; and writing compressed data and a micro directory table updates with a single write operation.

2. A method for writing directory information as recited in claim 1 wherein said step of writing a directory table within each of said compression groups includes the step of storing a corresponding micro directory table for a corresponding one of said compression groups to provide compressed data page directory information for a data region contained within said corresponding compression group.

3. A method for writing directory information as recited in claim 1 wherein said step of writing a directory table within each of said compression groups includes the step of writing one directory page entry for each compression data page, said directory page entry including a page length and a page offset.

4. A method for writing directory information as recited in claim 1 wherein said step of writing a macro directory table at a predefined location on the DASD for providing directory information for said plurality of compression group includes the step of writing address translation information for translating a host logical block address to a compression group base address.

5. A method for writing directory information as recited in claim 4 wherein said step of writing a directory table within each of said compression groups includes the step of writing page translation directory information for identifying a page offset and a page length for a requested page from said compression group base address.

6. A distributed directory structure for directory information for compressed data on a direct access storage device (DASD) including a plurality of compression groups for storing compressed data, said distributed directory structure comprising:

a micro directory table located within a corresponding one of said compression groups, said micro directory table providing directory information for said corresponding compression group;

a macro directory table at a predefined location on the DASD, said macro directory table providing directory information for said plurality of compression group; and means for writing compressed data and a micro directory table updates with a single write operation.

7. A distributed directory structure for directory information as recited in claim 6 wherein said micro directory table includes a plurality of page entries.

8. A distributed directory structure for directory information as recited in claim 7 wherein each page entry includes a page size value and a page location value.

9. A distributed directory structure for directory information as recited in claim 6 wherein said micro directory table includes directory information for identifying a page offset of a requested page, said page offset is from a starting compression group base address.

* * * * *